United States Patent [19]

Kato et al.

[11] 4,236,901
[45] Dec. 2, 1980

[54] AIR CLEANER WITH SECONDARY AIR FILTER ELEMENT

[75] Inventors: Yasutosi Kato, Anjo; Hideo Kamo, Chiryu; Tadashi Ogawa, Kariya; Kazuhiko Ito, Toyota; Katsuziro Sato, Toyota; Tatsuo Asai, Toyota, all of Japan

[73] Assignees: Nippondenso Co., Ltd., Kariya; Toyota Jidosha Kogyo Kabushiki Kaisha, Toyota, both of Japan

[21] Appl. No.: 970,337

[22] Filed: Dec. 18, 1978

Related U.S. Application Data

[63] Continuation of Ser. No. 816,470, Jul. 18, 1977, abandoned.

[30] Foreign Application Priority Data

Aug. 6, 1976 [JP] Japan .............................. 51-105755[U]

[51] Int. Cl.² .............................................. B01D 50/00
[52] U.S. Cl. ......................................... 55/276; 55/350; 55/385 B; 55/417; 55/484; 55/493; 55/497; 55/500; 55/504; 55/509; 55/529; 55/DIG. 28; 60/293; 137/515.7; 137/544; 137/856; 181/229
[58] Field of Search ..................... 55/276, 350, 385 B, 55/417, 482, 484, 493, 497–502, 504, 509, 510, 529, DIG. 28; 60/289, 293, 304, 307; 137/515.7, 544, 856; 181/231, 229

[56] References Cited

U.S. PATENT DOCUMENTS

| | | | |
|---|---|---|---|
| 1,874,720 | 8/1932 | Wallace | 55/484 |
| 2,478,054 | 8/1949 | Ray et al. | 55/501 |
| 3,347,217 | 10/1967 | Di Giorgio | 55/510 X |
| 3,759,015 | 9/1973 | Saxby | 55/DIG. 28 X |
| 3,906,724 | 9/1975 | Yoshizaki | 55/484 X |
| 3,913,322 | 10/1975 | Over et al. | 60/304 X |
| 4,083,184 | 4/1978 | Ushijima et al. | 60/293 |

Primary Examiner—Kathleen J. Prunner
Attorney, Agent, or Firm—Cushman, Darby & Cushman

[57] ABSTRACT

A cylinder primary air filter element is coaxially disposed within a cylindrical shell between an air intake pipe and an outlet provided in the shell. A resilient secondary air filter element is deformably secured in an opening formed in a sidewall of the shell so as to be located outside the outer periphery of the primary air filter. The secondary filter element is secured in place by a filter element retaining plate which is arcuately shaped so as to be concentric with the primary filter element and is readily detachably attached to the shell. A sufficiently enlarged air flow passageway is thus defined between the outer periphery of the primary air filter element and the filter element retaining plate and consequently the resistance encountered by the air flowing through this passageway may be considerably reduced and the excessive bulging of the air cleaner may be avoided. A reed valve assembly is connected to the outlet of a housing which surrounds the secondary filter element. The reed valve assembly permits the air flowing through the secondary filter element to be fed, for example, to the exhaust pipe of an internal combustion engine.

3 Claims, 12 Drawing Figures

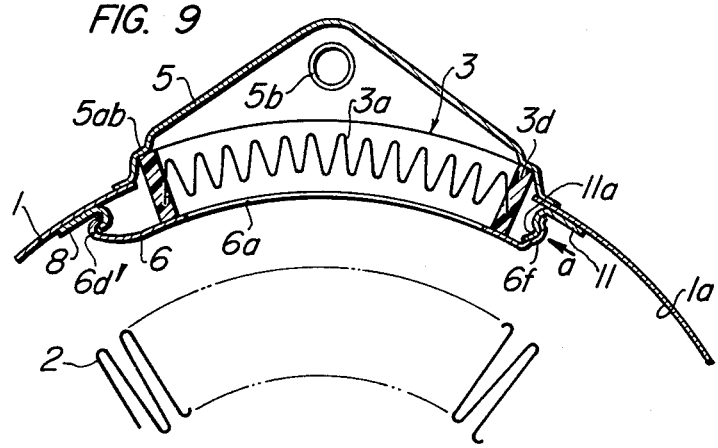
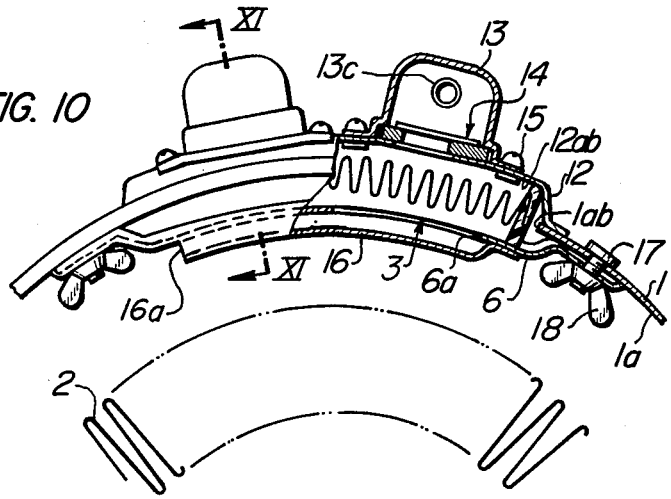
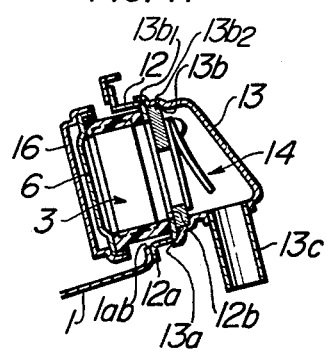

AIR CLEANER WITH SECONDARY AIR FILTER ELEMENT

This is a continuation of application Ser. No. 816,470 filed July 18, 1977, now abandoned.

The present invention relates generally to an air cleaner for an automotive vehicle and more particularly to an air cleaner with a secondary air filter element which is particularly adapted for use in an automotive vehicle with an air pump and/or exhaust gas recirculation system to which is supplied the secondary air from the air cleaner.

In conventional air cleaners with a secondary air filter element, the secondary air filter element consists in general of a filter medium encased in a box-shaped steel container with an open top and an apertured bottom, and an apertured steel cap attached to the opened top. The secondary air filter element is interposed between a housing attached to the upright sidewall of an air cleaner shell and is communicated with, for instance, a reed valve assembly for supplying secondary air to the exhaust pipes adjacent to the exhaust valves of an internal combustion engine and a filter element mounting plate made of steel and releasably attached to the upright sidewall of the shell.

Conventional air cleaners of the type described, however, have some problems. First, the secondary air filter element cannot be deformed when installed, so that an air flow passageway between the cylindrical primary air filter element assembly and the filter element retaining or mounting plate inevitably becomes narrow. As a result, the resistance encountered by the air flowing through this passageway increases with a resultant increase in negative pressure which adversely affects the operation of the exhaust gas recirculation system. In order to solve this problem, an attempt may be made to further protrude the housing from the air cleaner shell so that the secondary air filter element may be positioned more radially outwardly of the primary air filter element assembly, thereby increasing the annular passageway between the filter element retaining or mounting plate and the primary air filter element assembly. However, this arrangement inevitably results in interference of the air cleaner with other components installed in the vicinity thereof so that the engine compartment must be uneconomically increased in size. In addition, since the secondary air filter element casing and its cap are made of steel, the steps for production and assembly thereof are very complex and tedious and consequently the cost of the filter element is very expensive.

One of the objects of the present invention is, therefore, to provide an air cleaner of the type capable of filtering both primary and secondary air and of substantially overcoming the above and other problems encountered in the prior art air cleaners.

Another object of the present invention is to provide an air cleaner of the type described and wherein the passageway between the outer periphery of a primary filter element assembly and the inner periphery of a secondary air filter element assembly is sufficiently enlarged so that the resistance encountered by the air flowing through this passageway may be considerably reduced as compared with the prior art air cleaners and consequently the problems described above may be substantially solved.

A further object of the present invention is to provide an improved secondary air filter element which is especially adapted for use in an air cleaner in accordance with the present invention and which consists of a minimum number of parts, that is, only two parts: a filter medium and a filter medium container so that a minimum number of steps is required for the fabrication and assembly of the filter elements and consequently the cost can be considerably reduced as compared with prior art filter elements.

To the above and other ends, the present invention provides an air cleaner wherein a secondary air filter element consists of a filter medium container made of a resilient material and a filter medium encased in the container; and a filter element retaining or mounting plate for detachably mounting the filter element along the interior or exterior surface of the upright sidewall of the cleaner shell is arcuated concentrically of the upright sidewall of the shell and is detachably attached to the upright sidewall of the air cleaner shell so that the secondary air filter element interposed between the retaining or mounting plate and a housing attached to the exterior surface of the sidewall of the air cleaner shell or case may be deformed concentrically of the sidewall of the air cleaner shell, whereby a sufficiently enlarged air flow passageway may be defined between the retaining or mounting plate and the outer periphery of a primary air filter element assembly disposed within the air cleaner shell.

The above and other objects, features and advantages of the present invention will become more apparent from the following description of preferred embodiments thereof taken in conjunction with the accompanying drawings.

FIG. 9 is a fragmentary sectional view of another preferred embodiment of an air cleaner in accordance with the present invention;

FIG. 10 is a fragmentary sectional view of a further embodiment of an air cleaner in accordance with the present invention;

FIG. 11 is a sectional view taken along the line XI—XI of FIG. 10; and

FIG. 12 is a perspective view of a modified retaining or mounting plate.

Same reference numerals are used to designate similar parts throughout the figures.

Prior to the description of the preferred embodiments of the present invention, a typical prior art air cleaner will be described briefly in order to more distinctly and specifically point out the problems thereof which the present invention contemplates resolving.

Figure 1:
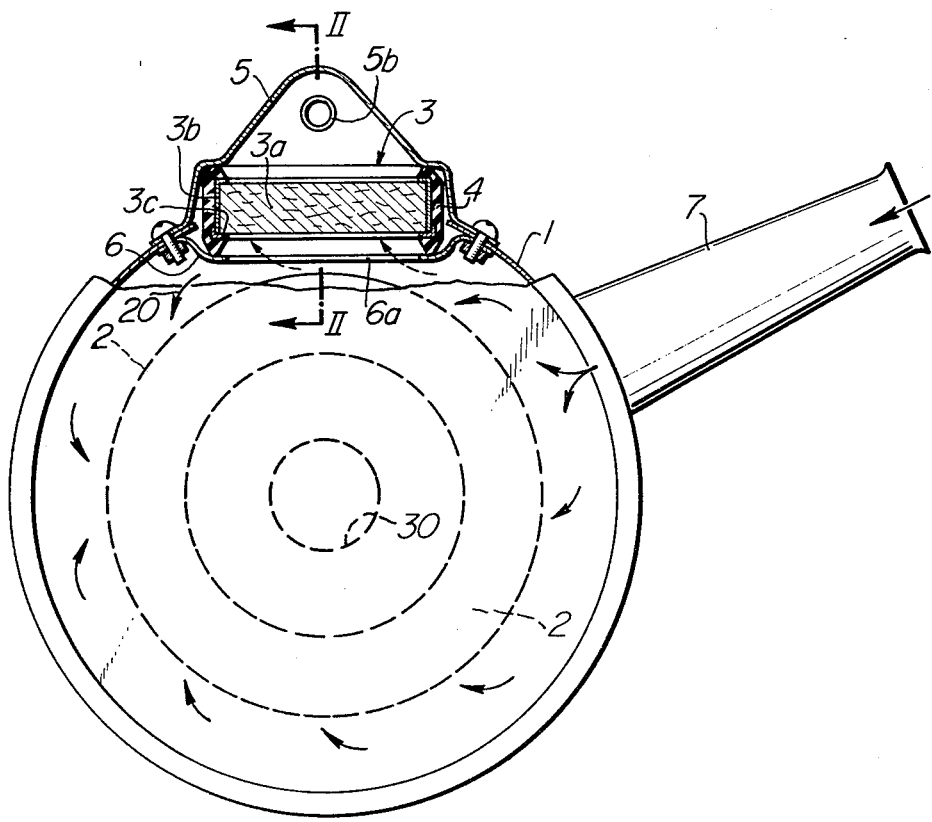
FIG. 1 is a top plan view partly in section of a prior art air cleaner.
Figure 2:
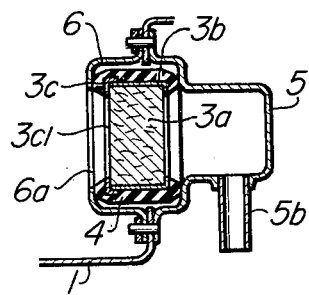
FIG. 2 is a fragmentary sectional view taken along the line II—II of FIG. 1.

In FIGS. 1 and 2 there is shown a typical prior art air cleaner to which the present invention pertains. Within a cylindrical case or shell 1 a plurality of primary air filter elements 2 arranged in a cylindrical ring for filtering the air to be charged into a carburetor (not shown) are concentrically disposed between the sidewall of the cylindrical case 1 in which the air inlet 7 is provided, and the primary air outlet 30. A secondary air filter element 3 is comprised of a filter medium 3a made of fibers, a case or container 3b made of steel and comprised of a top, a bottom, end walls and opened sidewalls and a cap 3c made of steel and formed with an opening 3c1 and attached to the inner sidewall of the case or container 3b. Rubber gaskets 4 are fitted over the top and bottom of the filter element 3.

Attached securely to the case or shell 1 is a housing 5 which is roughly triangular in cross section and has a top, a bottom, two stepped outer sidewalls and an opened inner sidewall, the housing 5 being communicated with a pipe 5b. The filter element 3 is placed in the housing 5 and is securely retained in position by a retaining or mounting plate 6 formed with an opening 6a which in turn is securely attached to the interior wall of the case or shell 1 with screws and nuts.

In operation, part of the air admitted into the shell 2 through an air entrance or intake pipe 7 is filtered by the filter element 3 and is supplied to a chamber defined by the inside of the housing 5 and the filter element 3. The air flow from the air intake pipe 7 to the filter element assembly 2 is indicated at 20.

The air cleaner of the type described above however has the following problems or defects:

(1) The filter element 3 has a steel case or container 3b and a steel cap 3c so that deformation of the filter element 3 is not permitted when installed. That is, the passageway between the outer periphery of the filter element assembly 2 and the retaining or mounting plate 6 is so narrow that the air flowing through this passageway encounters increased resistance. As a result, the operating efficiency of the associated internal combustion engine is decreased. In addition, most exhaust gas recirculation systems for reducing the pollutant emission are, in general, so designed as to be controlled in response to negative pressure generated in an intake pipe or manifold so that an increase in resistance to the air flow in the passageway between the filter element assembly 2 and the retaining or mounting plate 6 results in an increase in the negative pressure in the intake pipe or manifold. When the intake pipe pressure increases excessively, the exhaust gas recirculation system cannot be controlled as designed. Furthermore, an increased resistance to the air flow in the above passageway results in a decrease in amount of the air admitted through the air intake pipe into the air cleaner so that an effective use of both the primary and secondary air filter elements 2 and 3 cannot be attained.

(2) In order to increase the passageway between the outer periphery of the filter element assembly 2 and the retaining or mounting plate 6, the housing 5 may be extended outwardly radially to the case 1, but this arrangement results in interference with other parts of the associated automotive vehicle engine.

(3) As described above, the filter element 3 is comprised of steel case 3b and cap 3c. Therefore case or container 3b and cap 3c must be made of steel sheet by drawing, and in order to attach the cap 3c to the case or container 3b, the peripheral edges of the cap 3c must be folded or bent over the corresponding peripheral edges of the case or container 3b. Thus, the fabrication of the prior art filter element 3 is very complex and expensive.

FILTER ELEMENT, FIGS. 3 THROUGH 5

Figure 3:
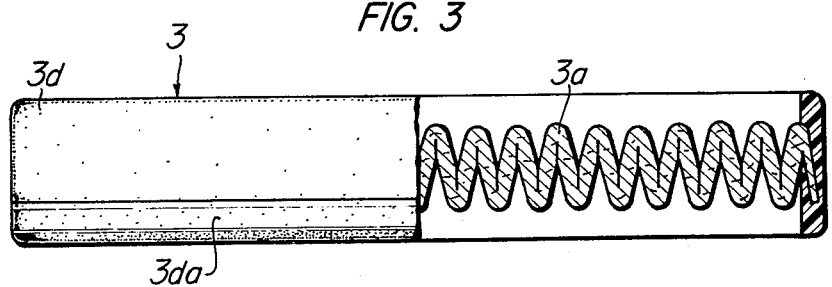
FIG. 3 is a top plan view of a secondary air filter element used in an air cleaner in accordance with the present invention, a lower section of the top of the filter element being broken away to show its filter medium.
Figure 4:
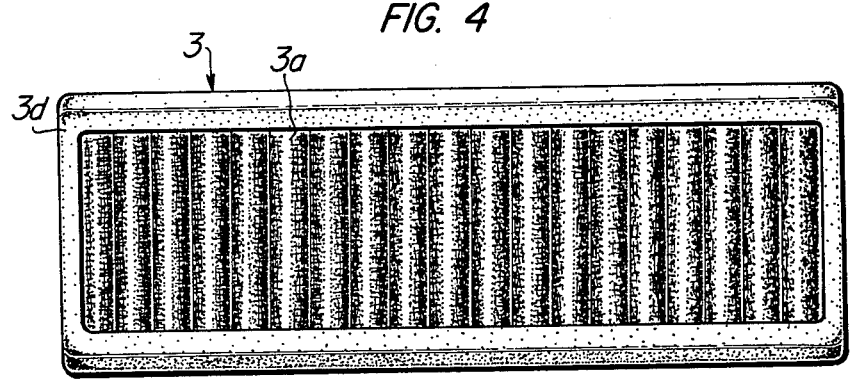
FIG. 4 is a front elevation view thereof.
Figure 5:
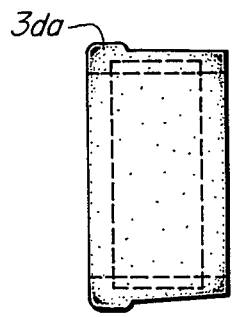
FIG. 5 is a side elevation view thereof.

First referring to FIGS. 3 through 5, the secondary air filter element 3 used in the air cleaner in accordance with the present invention will be described. The filter element 3 consists of a filter medium 3a made of nonwoven cloth, paper or the like, arranged in V-shaped pleats, and an air impervious container 3d, which is made of a suitable resilient material, contains the filter medium 3a. The case or container 3d may be made of a foamable urethane, vinyl chloride, rubber or the like, and the filter medium 3a is so arranged that its density continuously increases in the direction of filtration. That is, the density of the filter medium 3a gradually increases from the inlet side to the outlet side. In order to facilitate the mounting of the filter element 3 and to prevent the mis-mounting thereof, the container 3d is formed with ridges 3da extending over the top and bottom along the inner longitudinal side edges thereof.

FIRST EMBODIMENT, FIGS. 6 THROUGH 8

Figure 6:
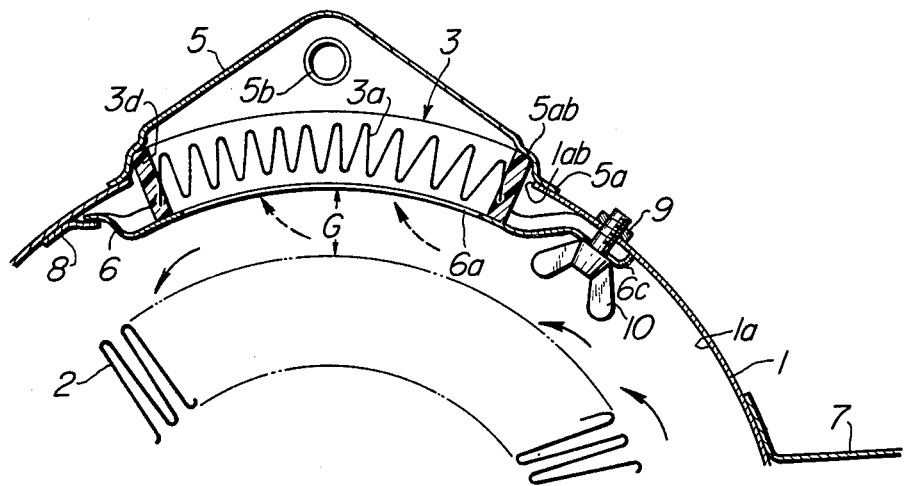
FIG. 6 is a fragmentary sectional view of one preferred embodiment of an air cleaner in accordance with the present invention.
Figure 7:
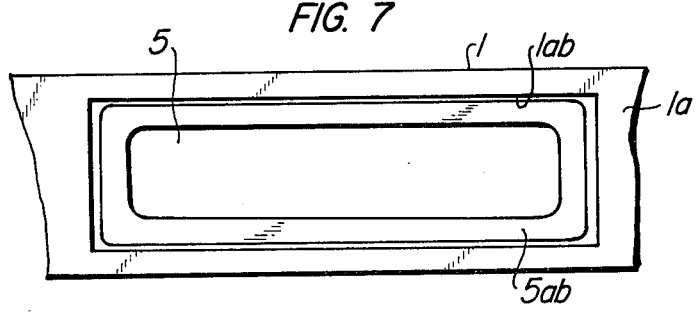
FIG. 7 is a fragmentary front elevation view of a housing 5 as viewed from the interior of a case or shell with the filter element 3 removed.
Figure 8:
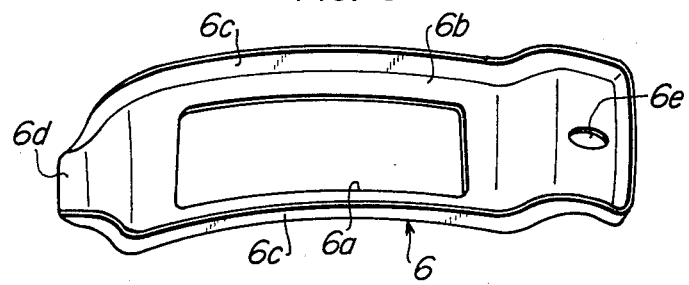
FIG. 8 is a perspective view of a retaining or mounting plate.

Referring to FIGS. 6 through 8, the first embodiment of an air cleaner in accordance with the present invention using the filter element 3 of the type described above will be explained. The cylindrical primary air filter element 2 is contained within a cylindrical steel case or shell 1 as in the conventional air cleaners as that shown in FIGS. 1 and 2. The filter element 2 filters the air to be directly admitted into a carburetor (not shown). The upright sidewall 1a of the case or shell 1 is formed with a rectangular opening or secondary air outlet opening $1_{ab}$.

The steel housing 5 is in general in the form of a short prism of a roughly triangular cross section, and the inner sidewall of the housing 5 is arcuated to conform with the annular interior wall of the case or shell 1 and is formed with a rectangular opening 5a larger in size than the opening $1_{ab}$ of the case or shell 1. The outer sidewalls, that is the sidewalls extending outwardly from the inner sidewall to converge at a common side, are formed with steps 5ab adjacent to their inner edges so that the container 3d of the filter element 3 may rest on the stepped portions 5ab. In assembly, the housing 5 is welded or otherwise securely attached to the exterior sidewall of the case or shell 1 so that the opening 5a of the housing 5 may be in alignment with the opening $1_{ab}$ of the case or shell 1 such that the secondary air outlet opening $1_{ab}$ constitutes an air inlet for the housing 5.

A pipe 5b has its one end welded or otherwise secured to the housing 5 so as to serve as the air outlet for the housing 5 and has its other end communicated with, for instance, a reed valve of the type which utilizes the negative pressure created by the pulsation of the exhaust gases for supplying the secondary air to the portions in the vicinity of exhaust valves of the engine. The pipe 5b also serves as secondary air outlet for the case 1 and the case 1 has a primary air outlet 30 to charge into the carburetor.

The mounting or retaining plate 6 which is also made of steel is in general arcuated substantially concentrically of the upright sidewall 1a of the shell 1 to provide an outwardly bowed curved surface means and is formed with an opening 6a which is slightly smaller in size than the opening $1_{ab}$ of the case or shell 1, a filter element receiving portion or marginal region 6b of the opening 6a adapted for snugly fitting with the ridges 3da of the filter element 3, raised upper and lower edges 6c for preventing the displacement of the filter element 3 after installation, a projection or retaining member 6d adapted to detachably engage with a mating retaining member 8 welded or otherwise secured to the interior wall of the case or shell 1, and a mounting hole 6e formed through a flanged portion remote from the retaining member 6d of the retaining or mounting plate 6.

A nut 9 is securely attached by projection welding or any other suitable method to the exterior surface of the upright sidewall 1a of the case of shell 1 for threadable engagement with a butterfly bolt 10 extended through the hole 6e so as to securely hold the retaining or mounting plate 6 in position after the retaining member 6d has been engaged with the mating retaining member 8.

Next the steps for assembling the air cleaner with the above construction will be described in detail. First, the projection or retaining member 6d of the retaining or mounting plate 6 is brought into engagement with the mating retaining member 8 attached to the upright sidewall 1a of the case or shell 1, and then the filter element 3 is placed between the marginal region 6b of the retaining or mounting plate 6 and the stepped portions 5ab of the housing 5 with the ridges 3da of the filter container 3d in abutment with the marginal region 6b of the retaining or mounting plate 6. Thereafter the retaining or mounting plate 6 is pressed against the interior surface of the sidewall 1a of the case or shell 1 while the butterfly bolt 10 is inserted into the mounting hole 6e of the retaining or mounting plate 6 and is screwed into the nut 9. Since the container 3d of the filter element 3 is resilient, it is deformed to conform with the upright sidewall 1a of the case or shell 1. When the butterfly bolt 10 is sufficiently tightened, the container 3d of the filter element 3 is air-tightly pressed against the stepped portions 5ab of the housing 5 and the marginal region 6b of the retaining or mounting plate 6. In other words, the container 3d of the filter element 3 also serves as a gasket. The flanged portion with the mounting hole 6e of the retaining or mounting plate 6 is also pressed against the interior surface of the upright sidewall 1a of the case or shell 1 as the butterfly bolt 10 is tightened so that the tightening force of the butterfly bolt 10 may be suitably controlled.

To remove the filter element 3, one need only to loosen and remove the butterfly bolt 10, with fingers without need for any tool, so that the filter element 3 may be cleaned or replaced in an extremely simple manner.

As seen from FIG. 6, showing the filter element 3 as installed, the width G of the passageway defined between the outer periphery of the filter element 2 and the retaining or mounting plate 6 is sufficiently wide so that the flow resistance may be substantially reduced as compared with the conventional air cleaners.

Next the mode of operation of the first embodiment with the above construction will be described. The air admitted through the intake pipe 7 flows in the directions indicated by the arrows in FIG. 6. Part of the admitted air is filtered by the filter element 2 to be admitted as the primary air into the carburetor (not shown) of the engine while the remaining air flows in the directions indicated by the broken-line arrows into the filter element 3, and the cleaned air is supplied to for instance to the reed valve through the pipe 5b intercommunicating the housing 5 and the reed valve.

SECOND EMBODIMENT, FIG. 9

The second embodiment shown in FIG. 9 is substantially similar in construction to the first embodiment described above except that the second embodiment features more simplified retaining means for the retaining or mounting plate 6. That is, an L-shaped retaining member 11 made of a resilient material is welded or otherwise secured to the interior surface of the upright sidewall 1a of the case or shell 1, and a radially inwardly extending arm 11a, which is flexible like a spring is suitably curved for detachable engagement with a mating projection 6f, extending radially outwardly from one end of the retaining or mounting plate 6. In like manner, a retaining member 8, hook-shaped in cross section, is welded or otherwise secured to the interior surface of the upright sidewall 1a of the case or shell 1 for engagement with a hook portion 6d' formed along the other side edge of the retaining or mounting plate 6.

In assembly, the hook portion 6d' of the retaining or mounting plate 6 is first engaged with the retaining member 8, and then the retaining or mounting plate 6 is brought into engagement with the L-shaped retaining member 11 while the latter is resiliently pushed in the direction indicated by an arrow a. Thus, without the use of a butterfly bolt 10, the retaining or mounting plate 6 may be securely held in position in a more simplified manner.

THIRD EMBODIMENT, FIGS. 10 AND 11

In the third embodiment shown in FIGS. 10 and 11, a reed valve of the type described above is mounted subsequent to the secondary air filter element 3, and a silencer cover is provided for suppressing noise generated by the reed valve during its operation.

The filter element casing, generally indicated by the reference numeral 12, is similar in construction to the housing 5 shown in FIG. 6. That is, the casing 12 is saucer- or cup-shaped in cross section with an opening 12a, and a bottom 12ab of the casing 12 is formed with an opening 12b. The casing 12 is welded or otherwise secured to the case or shell 1 with the opening 12a in alignment with the opening $1_{ab}$ of the case or shell 1.

Each valve housing 13 which is cup-shaped in cross-section is made of steel and has progressively outwardly extending stepped portions $13b_1$ and $13b_2$ defining an opening 13a. Two stepped portions 13b engage with the filter element casing 12 and a reed valve assembly, the first and second stepped portions being denoted $13b_1$ and $13b_2$, respectively. Two valve housings are communicated through pipes 13c with the exhaust pipes, respectively, of the first and third cylinders and of the second and fourth cylinders of the engine.

The reed valve assembly, generally indicated by the reference numeral 14, is interposed between the second step portion $13b_2$ of the valve housing and the filter element container 12 which, in turn, rests on the first stepped portion $13b_1$ of the valve housing 13. After the reed valve assembly 14 has been placed in position, the valve housing 13 is securely attached to the exterior surface of bottom 12ab of the filter element container 12 with screws 15.

A filter element retaining or mounting plate 6 is arcuated concentrically of the upright sidewall 1a of the shell 1 and is formed with an opening 6a offset from the center of the retaining or mounting plate 6 toward one of the two valve housings 13. A silencer cover 16, made of steel and arcuated concentrically of the upright sidewall 1a of the shell 1, is saucer-shaped in cross section with one end (the upper end in FIG. 10) open at 16a, and is securely welded or otherwise secured to the interior surface of the retaining or mounting plate 6. The retaining or mounting plate 6 is securely attached to the interior surface of the upright sidewall 1a of the shell 1 with bolts 17 and butterfly nuts 18. Noise produced by the reed valves 14 during the engine operation may be sufficiently dissipated as it is transmitted through the silencer cover 16.

MODIFICATION OF RETAINING OR MOUNTING PLATE, FIG. 12

In FIG. 12 there is shown a modified retaining or mounting plate 6 which is substantially similar in construction to the retaining or mounting plate shown in FIG. 8 except that lugs 6ca upwardly and downwardly protrude from the raised upper and lower edges 6c for engagement with the ridges 3da (see FIG. 5) of the filter element 3. Thus, the mounting of the filter element 3 may be much facilitated.

So far, the retaining or mounting plate 6 has been described as being securely but detachably attached to the interior surface of the upright sidewall of the shell, but it will be understood that the filter element retaining or mounting plate 6 provides lugs 6ca and said lugs 6ca engage with the ridges 3da so as to be attached to the exterior surface of the upright sidewall 1a of the shell 1 in order to facilitate the servicing of the filter element 3.

As described above, the filter element 3 in accordance with the present invention consists of the casing 3d made of resilient material so that it may be easily deformed to conform with the annular sidewall 1a of the air cleaner case or shell 1 when installed. As a result, filter elements 3 of the same size may be conveniently and advantageously attached to the air cleaners whose shells are different in diameter.

It is to be understood that the present invention is not limited to the preferred embodiments thereof described above in conjunction with the accompanying drawings and that various modifications may be effected without departing from the true spirit of the present invention. For instance, instead of steel, a synthetic resin having high strength may be used to form the casing or shell 1, the housing 5, the filter element retaining or mounting plate 6 and so on.

What is claimed is:

1. An air cleaner for an engine, comprising:
a generally cylindrical air filter element case having an air inlet through which air is to be admitted in use, a primary air outlet and a secondary air outlet opening;
a generally cylindrical primary air filter element encased in said case and generally concentrically disposed and interposed therein between said air inlet and said primary air outlet, so that air admitted through said inlet and discharged through said primary air outlet passes through and is filtered by said primary air filter element;
a housing provided as an outward protrusion on said case, covering said secondary air outlet opening and communicating therethrough with the inside of said case functionally upstream of said primary air filter element, said secondary air outlet opening defining an air inlet means for said housing so that some of the air admitted through said inlet in use may pass from said case, through said secondary air outlet opening or air inlet means and into said housing without passing through said primary air filter element;
means defining an air outlet from said housing which also serves as a secondary air outlet from said case;
a secondary air filter element disposed in said case and at least partially in said housing thereof and being interposed between said air inlet and said secondary air outlet, so that air admitted through said inlet and discharged through said secondary air outlet passes through and is filtered by said secondary air filter element;
said secondary air filter element including an air filter medium through which air may pass in being filtered thereby, and a container made of resilient material, perimetrically bounding said air filter medium and holding said air filter medium therein;
a retaining member on said case for air-tightly and detachably-retaining said secondary air filter element in place, said retaining member including outwardly-bowed curved surface means engaging said secondary air filter element and pressing said secondary air filter element centrally outwardly causing it to extend arcuately in a generally concentric sense relative to the general cylindricality of said case and causing there to be a greater clearance radially between the primary air filter element and the secondary air filter element than would exist were the secondary air filter element less arcuate than said retaining member presses it to become; said retaining member having opening means therethrough in order to permit air to have access therethrough to said secondary air filter element;
said case having a generally cylindrical sidewall having said secondary air outlet opening therethrough;
said housing having a generally arcuate outer wall that is generally arcuate generally concentrically with said case sidewall;
said housing arcuate outer wall having at least one generally cup-shaped valve housing provided thereon as a radially outward protrusion therefrom;
said secondary outlet being provided through said cup-shaped valve housing;
a reed valve assembly disposed in said cup-shaped valve housing of said casing and interposed between said secondary air filter element and said secondary air outlet; and
a noise-decreasing silencer cover which is medially-bowed-outwards arcuate in cross-section correspondingly with said retaining member, and being secured in radially inner facially covering relation to said retaining member, said silencer cover including two angularly opposite ends, with one of these said ends being open and the remainder of said silencer cover being closed.

2. The air cleaner of claim 1, further including:
the secondary air filter element container having upper and lower edges having ridge means formed thereon; and
said retaining member includes raised upper and lower edge means respectively having lugs protruding downwardly and upwardly therefrom for engaging with said ridge means for arcuately conforming said secondary air filter element with said retaining member.

3. The air cleaner of claim 1, wherein:
said retaining member includes two arcuately opposite ends, and there are nut and bolt means installed between each of said opposite ends of said retaining member and said generally cylindrical sidewall of said case to retain said retaining member in place.

* * * * *